United States Patent
Esser et al.

(10) Patent No.: US 6,685,350 B2
(45) Date of Patent: Feb. 3, 2004

(54) FASTENING DEVICE FOR TAILLIGHTS OF VEHICLES, PREFERABLY MOTOR VEHICLES

(75) Inventors: Gerhard Esser, Deizisau (DE);
Günther Holzmacher, Asperg (DE);
Otto Rolf Müller, Gruibingen (DE);
Rainer Kienzle, Ditzingen (DE)

(73) Assignee: Reitter & Schefenacker GmbH & Co. KG, Esslingen (DE)

( * ) Notice: Subject to any disclaimer, the term of this patent is extended or adjusted under 35 U.S.C. 154(b) by 0 days.

(21) Appl. No.: 10/062,580

(22) Filed: Jan. 30, 2002

(65) Prior Publication Data

US 2002/0118549 A1 Aug. 29, 2002

(30) Foreign Application Priority Data

Feb. 3, 2001 (DE) .......................... 101 04 906

(51) Int. Cl.$^7$ .............. F21S 8/10; F21V 19/00
(52) U.S. Cl. ............... 362/549; 362/382; 362/457
(58) Field of Search ................ 362/382, 496, 362/548, 549, 457, 273, 289, 274, 288

(56) References Cited

U.S. PATENT DOCUMENTS

| | | | | |
|---|---|---|---|---|
| 4,580,202 A | * | 4/1986 | Morette | 362/549 |
| 4,744,011 A | * | 5/1988 | Tomita et al. | 362/548 |
| 4,751,619 A | * | 6/1988 | Philippe et al. | 362/549 |
| 4,796,165 A | * | 1/1989 | Metti | 362/549 |
| 5,496,006 A | * | 3/1996 | Kulka et al. | 362/549 |
| 5,566,057 A | * | 10/1996 | Iwami | 362/549 |

* cited by examiner

Primary Examiner—Alan Cariaso
(74) Attorney, Agent, or Firm—Gudrun E. Huckett

(57) ABSTRACT

A fastening device for a taillight of a vehicle has at least one fastening element interacting with a counter element correlated with a housing of the taillight, wherein the counter element is adjustable relative to the housing of the taillight. The housing has a receptacle and the counter element is arranged in the receptacle and is preferably a threaded sleeve that is tightened by the fastening element, preferably a screw, against a wall of the mounting space for the taillight.

24 Claims, 4 Drawing Sheets

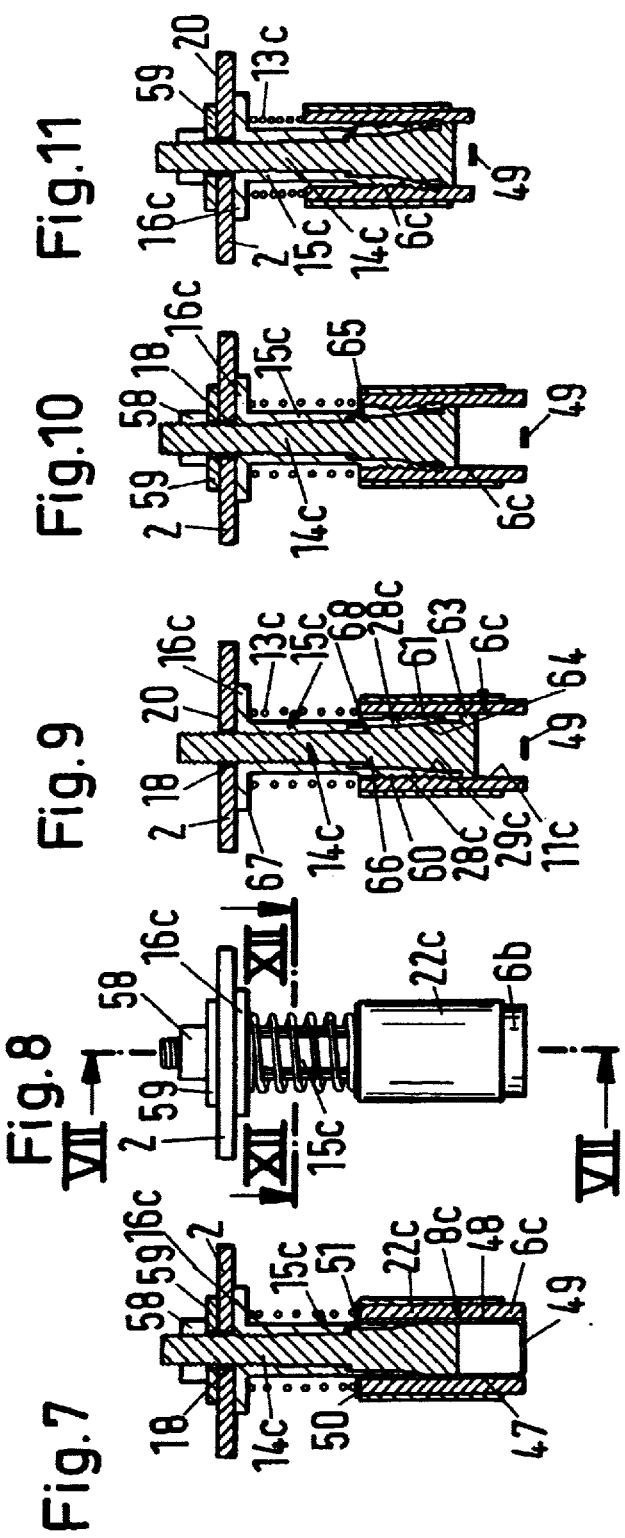
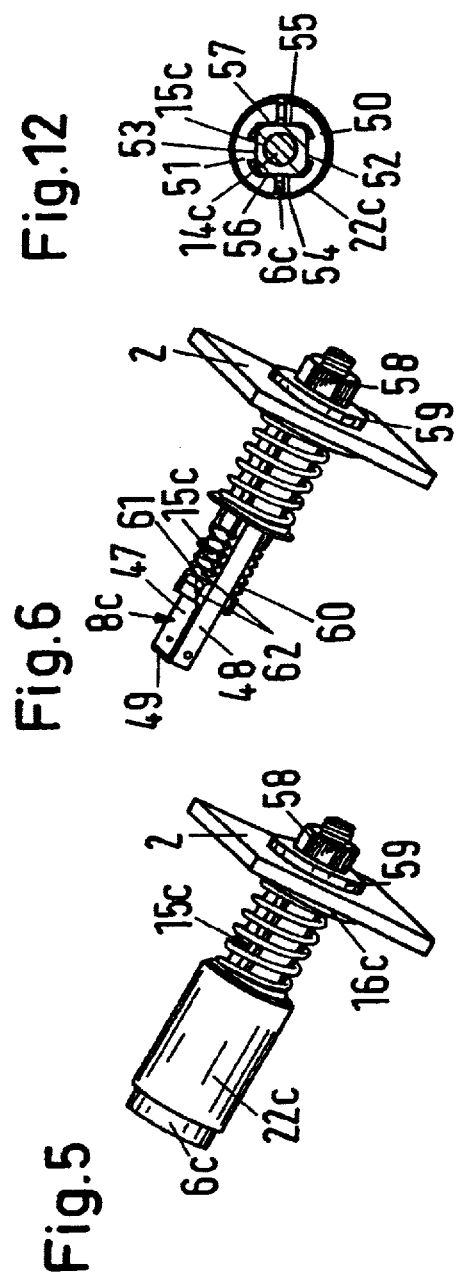

FASTENING DEVICE FOR TAILLIGHTS OF VEHICLES, PREFERABLY MOTOR VEHICLES

BACKGROUND OF THE INVENTION

1. Field of the Invention

The invention relates to a fastening device for taillights of vehicles, preferably motor vehicles, comprising at least one fastening element, preferably a screw, which interacts with a counter element correlated with the housing of the taillight.

2. Description of the Related Art

Taillights of motor vehicles must be precisely positioned in the fitting position. In order to precisely align the taillight in the proper fitting position, a gauge is employed. Subsequently, the taillight is connected by screws as fastening elements on the wall of the receiving space. As a result of tolerances of the car body skin it can happen that the taillight cannot be secured by the screws in the required fitting position. For compensating such tolerances, complex measures are required in order to be able to securely connect the taillight by screwing within the mounting space.

SUMMARY OF THE INVENTION

It is an object of the present invention to configure the fastening device of the aforementioned kind such that the taillight can be mounted in a simple way in the required fitting position even when the mounting space and/or the taillight housing has tolerances.

In accordance with the present invention, this is achieved in that the counter element is adjustable relative to the housing of the taillight.

With the fastening device according to the invention the counter element can thus be adjusted relative to the housing of the taillight. Even in the case of greater mounting tolerances, it is thus still possible to provide a simple and secure attachment of the taillight in the mounting space. The counter element is moved to such an extent that by means of the fastening element, preferably a screw, the taillight is securely fastened in the fitting position.

BRIEF DESCRIPTION OF THE DRAWING

In the drawing:

FIG. 5 is a perspective illustration of a fifth embodiment of the fastening device according to the invention;

FIG. 6 is a perspective illustration of a part of the fastening device according to FIG. 5;

FIG. 7 is a section along the line VII—VII of FIG. 8;

FIG. 8 is a side view of the fastening device according to FIG. 5;

FIG. 9 shows the fastening device according to FIG. 5 in an axial section but rotated by 90° relative to FIG. 7;

FIG. 10 shows in a representation corresponding to FIG. 9 the fastening device in the mounted state;

FIG. 11 shows an illustration corresponding to FIG. 10 of the fastening device in another fitting position; and FIG. 12 is a section along the line XII—XII of FIG. 8.

DESCRIPTION OF THE PREFERRED EMBODIMENTS

Figure 1:
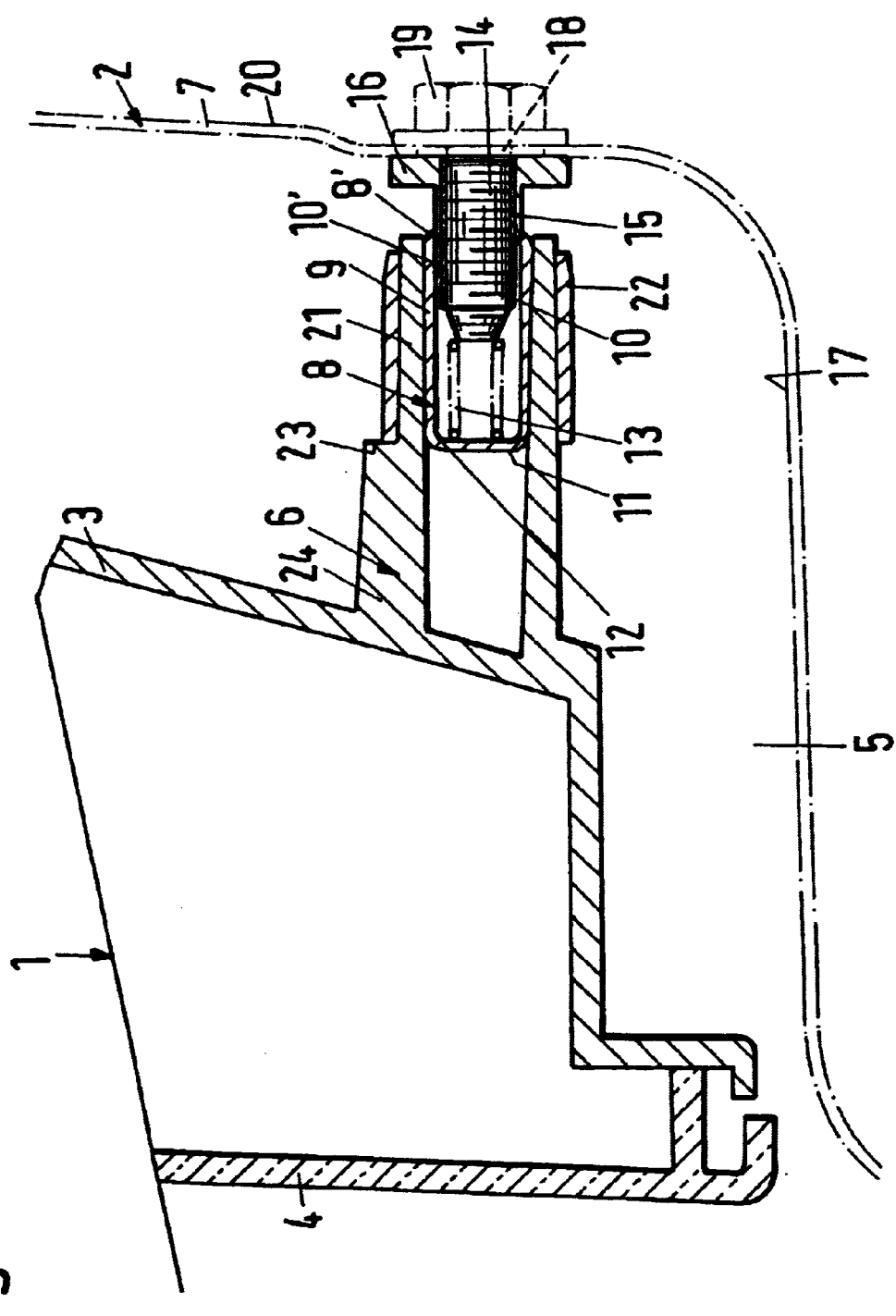
FIG. 1 is a section of a first embodiment of the fastening device according to the invention.

The fastening devices are provided to secure a taillight 1 on the car body 2 of a motor vehicle. The taillight 1 has a housing 3 in which, as is known in the art, the corresponding light sources (not illustrated) are arranged whose light passes through the lens 4 rearwardly relative to the travel direction of the vehicle. The taillight 1 is mounted in a mounting space 5 of the vehicle.

At least one sleeve-shaped projection 6 forming a receptacle projects from the housing 3 and extends in the direction toward the back wall 7 of the mounting space 5 of the car body 2. Advantageously, the projection 6 is a unitary part of the housing 3. A sleeve-shaped holder 8 is inserted into the projection 6 and rests with its wall 9 on the inner wall 11 of the projection 6. A pressure spring 13 is supported on a bottom 12 of the holder 8 and loads a fasting screw 14. A threaded sleeve 15 projects into the holder 8 into which the screw 14 is threaded. The threaded sleeve 15 is provided at one end with a radial collar 16 which rests against the inner side 17 of the car body 2 in the mounted position of the taillight 1. The screw 14 projects through an opening 18 in the car body 2 and rests with its head 19 in the mounted position of the taillight 1 against the inner side 20 of the car body 2.

The holder 8 can also be formed as a U-shaped securing clip whose parallel legs rest against the inner wall 11 of the projection 6 and are connected by a straight transverse stay with one another.

The projection 6 is provided at the level of the holder 8 with an end section 21 which has a reduced wall thickness and is surrounded by a ring 22. The ring 22 rests at least over a portion of its circumference on a radial shoulder 23 which is provided at a transition from the end section 21 into the thick section 24 of the projection 6, i.e., a section having a greater wall thickness. The ring 22 prevents a radial widening of the end section 21 of the projection 6 when tightening the screw 14. In this connection, the threaded sleeve 15 is radially elastically widened when tightening the screw 14 because the free end of the sleeve mantle is provided with axially extending longitudinal slots 10 between which sections 10' are provided that can be elastically bent radially outwardly. The sections 10' are bent outwardly in the radial direction by means of the screw 14 so that the holder 8 is pressed tightly against the inner wall of the projection 6.

By means of the described fastening device it is possible to mount the taillight 1 simply but precisely in the mounted position within the mounting space 5. Before the insertion of the taillight 1 into the mounting space 5, the threaded sleeve 15 is inserted into the holder 8 provided within the projection 6. The precise fitting position of the taillight 1 is determined by gauges (not illustrated). The taillight 1 is inserted such into the mounting space 5 that the lens 4 is in its proper fitting position. When inserting the taillight 1, the collar 16 of the threaded sleeve 15 contacts the car body 2 and is then moved against the force of the pressure spring 13 axially relative to the holder 8. Subsequently, the screw 14 is pushed through the opening 18 in the car body 2 and threaded into the threaded sleeve 15. It is seated fixedly within the holder 8. Upon tightening the screw 14, the threaded sleeve 15 is elastically widened in the way described above so that the holder 8 is pressed against the inner side of the projection 6 and, in this way, the taillight 1 is secured in its proper fitting position. In this way, the taillight 1 can be easily and quickly mounted in the fitting position. The threaded sleeve 15 makes possible a simple compensation of car body tolerances within the mounting area of the taillight 1. The holder 8 is provided at its free end with at least one protection means 8' against rotation formed by at least one, preferably several radially inwardly projecting portions which engage axially extending recesses in the outer side of the threaded sleeve 15. The portions 8' and the matching recesses are approximately of the same width.

Depending on the size and/or shape of the taillight 1, several projections 6 can be provided so that the taillight 1 can be mounted simply and position-precisely on several locations in the described way within the mounting space 5 of the vehicle.

Figure 2:
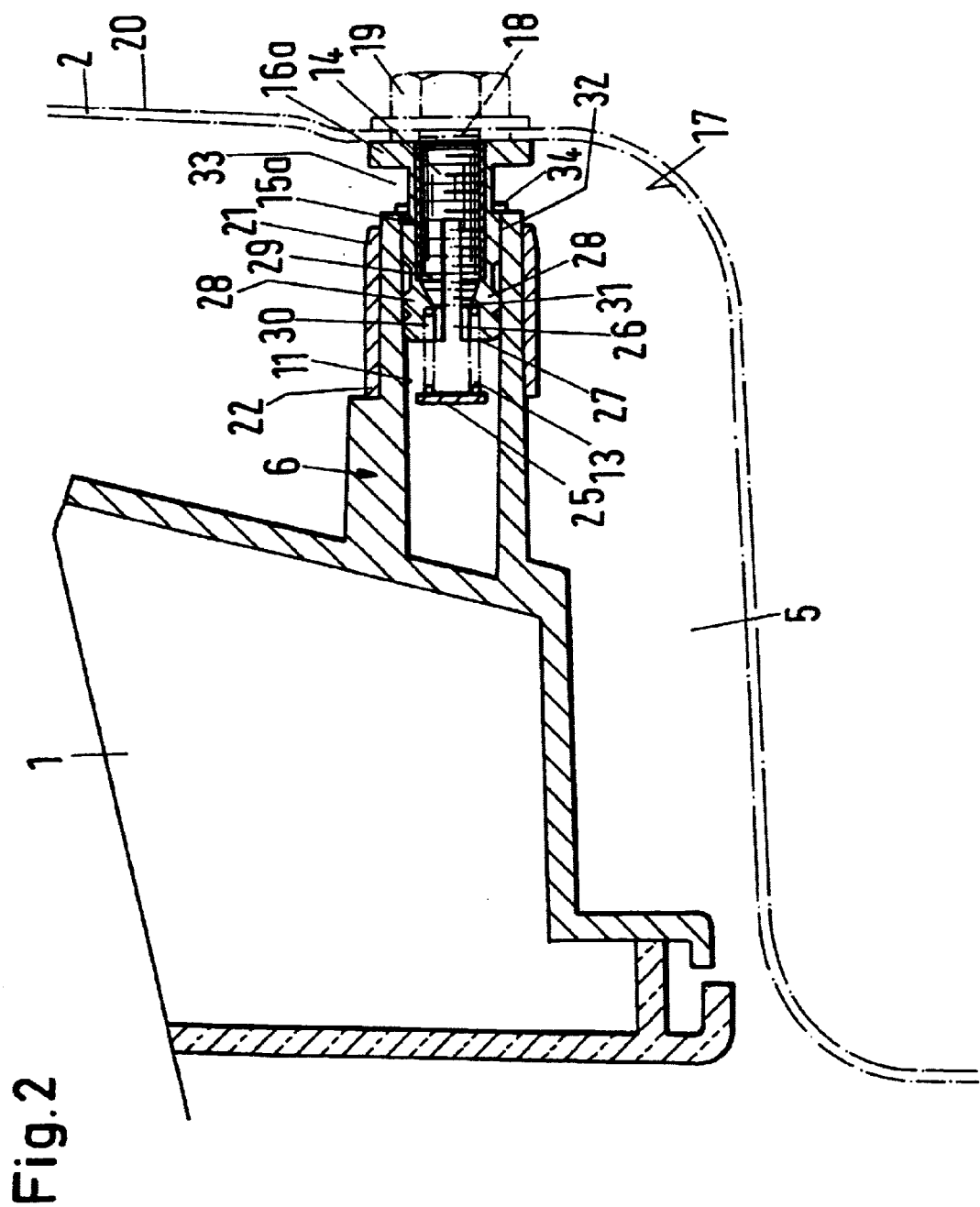
FIG. 2 shows in section a further embodiment of the fastening device according to the invention.

In the embodiment according to FIG. 2, the pressure spring 13 is supported on a transverse stay 25 which is provided in the projection 6 and extends diametrically.

The threaded sleeve 15a contacts directly the inner wall 11 of the projection (receptacle) 6. Within the projection 6 the threaded sleeve 15a has a greater wall thickness than in the area external to the projection 6. As in the preceding embodiment, the threaded sleeve 15a can be moved axially relative to the projection 6 during mounting of the taillight 1. When the screw 14 is threaded through the opening 18 provided in the skin of the car body 2 into the threaded sleeve 15a, the sleeve 15a is elastically widened and in this way the taillight 1 is secured in its correct fitting position. The threaded sleeve 15a is secured against rotation in the projection 6 so that it can be reliably axially moved during mounting of the taillight 1. Since the threaded sleeve 15a can be moved relative to the projection 6, the position-precise mounting of the taillight 1 is possible reliably and simply. By means of a gauge the taillight 1 is first brought into the precise fitting position within the mounting space 5 until the collar 16a of the threaded sleeve 15a contacts the outer wall 17 of the car body.

The threaded sleeve 15a is slotted at the end facing away from the collar 16a. It has at least two diametrically oppositely positioned, axially extending longitudinal slots 26 which begin at the free end 27 of the threaded sleeve 15a. In the illustrated embodiment, the longitudinal slots 26 extend approximately over half the length of the threaded sleeve 15a. Between the longitudinal slots 26 springy portions 28 are thus formed which, when tightening the screw 14, are forced radially outwardly to rest tightly against the inner wall 11 of the projection 6. In order to achieve a high pressing force, the inner sides of the springy portions 28 are provided with inner wall sections 29 conically tapering in the direction of the free end 27. The screw 14 impacts on these sections 29 when tightened. By means of this conically tapering inner wall sections 29, the springy portions 28 of the threaded sleeve 15a are forced radially outwardly. The conically tapering inner wall section 29 is provided at such an axial position that the screw 14 with its shaft reaches in any given situation this conically tapering inner wall section 29 so that the springy portions 28 of the threaded sleeve 15a are forced radially outwardly.

A cylindrical recess 30 opens centrally into the end face 27 of the threaded sleeve 15a, and the pressure spring 13 projects into this recess 30. The spring 13 is supported on the radial bottom 31 of the recess 30. The conical section 29 opens centrally into the bottom 31 of the depression 30.

For axially securing the threaded sleeve 15a in the projection 6, the outer mantle surface 32 of the threaded sleeve 15a is provided with an open space in the form of an annular groove 33 which is delimited at one axial end by the collar 16a. A spring cage 34 engages the annular groove 33 and provides a stop. The annular groove 33 has such an axial length that the threaded sleeve 15a even for greatest mounting tolerances can be forced in the described way tightly against the inner side 17 of the car body 2 by the spring 13. The ring 22 surrounding the projection 6 prevents, as in the preceding embodiment, an impermissible widening of the end section 21 of the projection 6 by the springy portions 28 of the threaded sleeve 15a.

Figure 4:
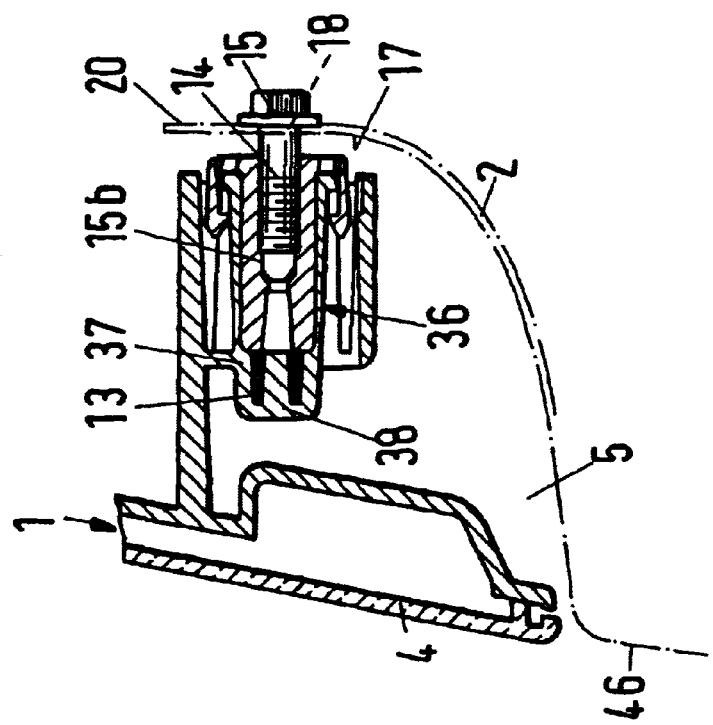
FIG. 4 is a sectional view of a fourth embodiment of the fastening device according to the invention.
Figure 3:
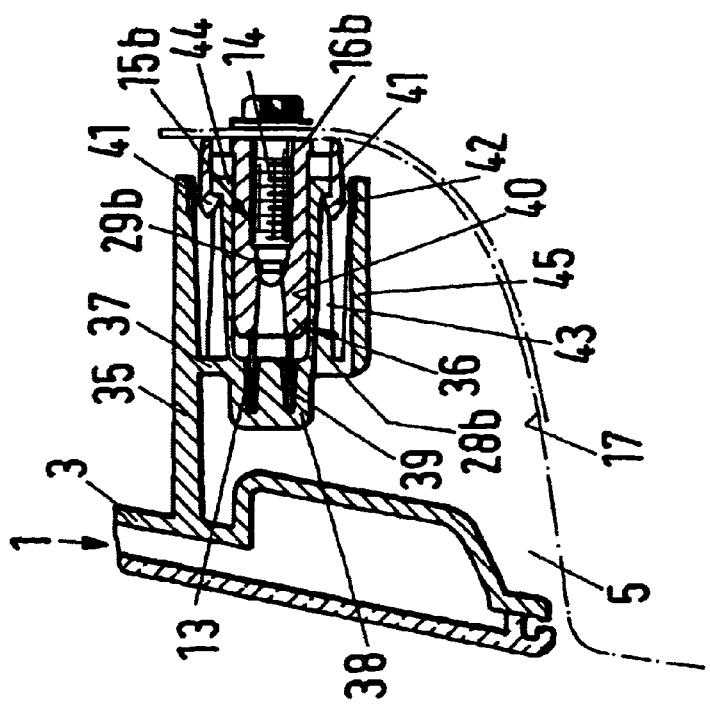
FIG. 3 shows in section a third embodiment of the fastening device according to the invention.

In the embodiment according to FIGS. 3 and 4, the housing 3 of the taillight 1 is provided with a transversely projecting rib 35 which is preferably formed as a unitary part of the housing 3. On the rib 35 a receptacle 36 is provided which is preferably a unitary part of the rib 35. The receptacle 36 is, for example, cylindrically formed and has a bottom 37 which projects partially radially past the receptacle 36. The receptacle 36 is connected to the rib 35 with this projecting bottom 37 which is preferably embodied as monolithic part of the rib 35. The bottom 37 is provided centrally with a thick portion 38 which projects in the direction toward the taillight 1 and is provided at the inner side with an annular groove 39 in which one end of the pressure spring 13 is received.

The threaded sleeve 15b is inserted into the receptacle 36 and rests against the inner wall 40 of the receptacle 36. On its end projecting past the receptacle 36 the threaded sleeve 15b is provided with a collar 16b. The collar 16b is provided on its circumference with at least two diametrically opposed, axially extending securing elements 41 which are provided at their free ends with a radially inwardly projecting nose 42, respectively. The securing elements 41 project with their noses 42 into an open space in the form of axially extending recesses 43 which are provided in the outer side of the receptacle 36. The width of the recesses 43 corresponds to the width of the noses 42 so that the threaded sleeve 15b cannot rotate about its axis but can only move axially relative to the receptacle 36. The recesses 43 are delimited by a radial shoulder 44 at their end facing away from the taillight 1. This radial shoulder 44 also serves as a stop for the securing elements 41. This ensures that the threaded sleeve 15b cannot be pulled accidentally out of the receptacle 36.

In the area adjacent to the rib 35 an outer wall 45 surrounds at a radial spacing the receptacle 36. The outer wall 45 is advantageously a monolithic part of the bottom 37 of the receptacle 36.

Corresponding to the preceding embodiment, the threaded sleeve 15b is provided at a spacing from the free end with a conically tapering inner wall section 29b against which the free end of the screw 14 rests in the initial position (FIG. 4).

Before the taillight 1 is fastened on the car body 2 of the vehicle, the threaded sleeve 15b is moved so far into the receptacle 36 (FIG. 4) that it rests against the bottom 37 of the receptacle 36. The taillight 1 is positioned with a gauge in its precise fitting position in the mounting space 5. In this fitting position the threaded sleeve 15b has a spacing from the inner side 17 of the car body 2.

The screw 14 is threaded into the threaded sleeve 15b through the opening 18 of the car body 2 until the screw head 15 contacts the exterior side 20 of the car body 2. The precise fitting position of the taillight 1 is determined, for example, in that the lens 4 with its outer side is positioned flush with the outer sides 46 of the car body 2 adjoining the mounting space 5.

By turning the screw 14, the threaded sleeve 15b is moved out of the receptacle 36 until its collar 16b rests against the inner side 17 of the mounting space 5 of the car body 2 (FIG. 3). By means of the securing elements 41 engaging with their noses 42 the recesses 43, it is ensured that the threaded sleeve 15b cannot rotate relative to the receptacle 36. Thus, the threaded sleeve 15b is reliably moved out of the receptacle 36 and forced against the car body 2.

Via the conically tapering inner wall section 29b, the springy portions 28b, separated by longitudinal slots as in the previous embodiments, are forced radially outwardly against the inner wall 40 of the receptacle 36 so that the taillight 1 is secured reliably in the fitting position. The pressure spring 13 is positioned in the mounted position of the taillight 1 with prestress on the threaded sleeve 15b.

The securing elements 41 are formed and/or provided such that even for greater car body tolerances the threaded sleeve 15b is pressed reliably with its collar 16b onto the outer surface 17 of the car body 2.

FIGS. 5 through 12 show a further embodiment of the fastening device. The taillight is not illustrated in FIGS. 5 through 12. The projection 6c is however provided on the housing 3 of the taillight 1 in accordance to the embodiment of FIGS. 1 and 2 (see illustrations of FIGS. 1 and 2) and is preferably a monolithic part thereof. The cylindrical projection 6c has advantageously a circular cross-section and has a constant wall thickness over its length. A sleeve 22c is seated on the projection 6c and prevents a radial widening of the projection 6c during mounting.

A substantially U-shaped holder 8c is inserted into the projection 6c which according to the embodiment of FIGS. 1 and 2 is formed as a U-shaped holding clip. The holder 8c has two parallel extending legs 47, 48 which are connected to one another by a straight stay 49 extending at a right angle to the stays 47, 48. The free ends 50, 51 of the legs 47, 48 are bent in opposite directions relative to one another at a right angle and rest on the end face of the projection 6c. Advantageously, the free ends 50, 51 also slightly project across the sleeve 22c.

The threaded sleeve 15c projects into the space between the legs 47, 48 of the holder 8c. As in the preceding embodiments, the sleeve 15c is also embodied as a spreading sleeve. It has a radially outwardly oriented collar 16c with which it rests against the car body 2 in the mounted position. The threaded sleeve 15c, as illustrated in FIG. 12, has a quadrangular contour and is received in the projection 6c so as to be secured against rotation. The free ends 50, 51 of the legs 47, 48 of the holder 8c are semi-circular (FIG. 12) and have such a shape that they provide the rotational securing action for the threaded sleeve 15c. Approximately at half their length, the two ends 50, 51 are provided with a rectangular projection 52, 53, respectively. The two projections 52, 53 are positioned diametrically opposite one another, are radially inwardly oriented, and contact with their planar end faces the planar sidewall of the threaded sleeve 15c. Moreover, the two ends 50, 51 are provided with planar sidewalls 54, 55; 56, 57 on which the other sidewalls of the threaded sleeve 15c rests with a real contact. In this way, the ends 50, 51 are supported on all four sides of the threaded sleeve 15.

In the area outside of the projection 6c, the threaded sleeve 15c is provided with a threaded bore for receiving the screw 14c which projects through the opening 18 in the skin (sheet metal) of the car body 2 into the interior and supports a nut 58. The nut 58 rests with interposition of a washer 59 against the inner side 20 of the car body skin 2.

In the area within the receptacle or projection 6c the threaded sleeve 15c is slotted. As in the preceding embodiments, it is provided with at least two axially extending longitudinal slots. Accordingly, the sections 28c are formed (FIG. 9) which are provided with profilings 60, 61 at their outer side resting against the inner wall 11c of the projection 6c. They extend across the slotted area of the threaded sleeve 15c and, for example, are formed such that they have relatively sharp edges 62 extending in the circumferential direction of the threaded sleeve 15c and, over the axial length of the slotted area of the threaded sleeve 15c, are positioned at a spacing to one another. With such a configuration, a reliable frictional connection between the threaded sleeve 15c and the projection 6c is ensured.

The screw 14c projects through the threaded sleeve 15c into the projection 6c and is radially guided with a flange 63 (FIG. 9) on the inner wall 11c of the projection 6c. This flange 63 is provided at the end of the screw 14c and extends radially outwardly. The screw 14c has a wall portion 64 conically widening in the direction toward the flange 63 which during mounting interacts with the corresponding conically tapering inner wall section 29c. The screw 14c is provided with a thread only in the end area facing away from the flange 63.

In the area between the collar 16c of the threaded sleeve 15c and the projection 6c, the pressure spring 13c is positioned which is supported with its ends on the collar 16c and the end face of the projection 6c, respectively.

The threaded bore of the threaded sleeve 15c has a transition at its inner side into a widened bore portion 65 at a small spacing from the slotted area (FIG. 10). At an axial spacing from the transition, this bore portion 65 is provided with a conically tapering wall section 29c. The screw 14c in this area is also provided with a widened portion 66 which has a conical wall portion 64.

When mounting the taillight (not illustrated in this embodiment), the holder 8c, the threaded sleeve 15c, and the screw 14c (FIG. 9) are already inserted into the receptacle or projection 6c of the taillight. The screw 14c projects through the opening 18 of the car body (skin) 2 to the interior. As has been described in connection with the preceding embodiments, the taillight is moved with a gauge into the precise fitting position. Depending on the mounting tolerances, the spacing of the projection 6c from the outer side of the car body (skin) 2 differs. FIG. 10 shows the situation when very large mounting tolerances are present. In this case, the projection 6c has the greatest spacing from the car body (skin) 2. In this position, the threaded sleeve 15c is arranged such relative to the projection 6c of the taillight that the aforementioned transition of the threaded sleeve 15c is arranged in the slotted section having a wider outer diameter at the level of the end face of the projection 6c facing the car body (skin) 2.

FIG. 11 shows the situation when the mounting tolerances are very minimal. In this case, the projection 6c of the taillight has a significantly smaller spacing from the car body (skin) 2 than in the position according to FIG. 10. Accordingly, the pressure spring 13c is also compressed to a greater extent in comparison to the position according to FIG. 10. Since the threaded sleeve 15c in both positions according to FIGS. 10 and 11 rests with its collar 16c against the outer side of the car body (skin) 2, the longitudinally slotted area of the threaded sleeve 15c is positioned farther within the projection 6c than in the position according to FIG. 10.

In both cases according to FIGS. 10 and 11, the washer 59 is placed onto the end of the threaded sleeve 15c projecting through the opening 18 of the car body (skin) 2 as soon as the taillight has reached its precise fitting position, and then the nut 58 is threaded thereon. Since the nut 58 rests via the washer 59 on the inner side 20 of the car body (skin) 2, the screw 14 is moved axially relative to the threaded sleeve 15c. By means of the contacting conical wall sections 29c, 64, the threaded sleeve 15c, as explained in the preceding embodiments, is elastically widened and pressed against the inner wall 11c of the projection 6c. The pressing force is so high that the taillight is securely held in the mounted position.

The collar 16c of the threaded sleeve 15c is positioned advantageously with interposition of a sealing disc 67 (FIG. 9) on the car body (skin) 2. At the transition from the narrow portion to the widened portion of the screw 14c, a sealing ring 68 is positioned, preferably in the form of an O-ring (FIG. 9). The sealing disc 67 and the sealing ring 68 seal reliably the wet area relative to the dry area.

In the described embodiments, the taillight 1 is secured by means of screws 14, 14c not directly on the car body 2 but by frictional connection between the threaded sleeve 15, 15a, 15b, 15c and the projection or receptacle 6, 6c, 36. The taillight 1, if needed, can be simply demounted. The screw 14 or the nut 58 are simply rotated in the opposite direction so that the threaded sleeve can be screwed into the receptacle or the projection. As a result of the relative movability between the threaded sleeve and the taillight 1, greater car body tolerances for mounting of the taillight 1 can be taken into account and compensated in a simple way. Therefore, the taillight 1 can be mounted without problems in the desired precise fitting position.

While specific embodiments of the invention have been shown and described in detail to illustrate the inventive principles, it will be understood that the invention may be embodied otherwise without departing from such principles.

What is claimed is:

1. A fastening device for a taillight of a vehicle, comprising:
    at least one fastening element interacting with a counter element correlated with a housing of the taillight wherein the counter element is adjustable relative to the housing of the taillight;
    at least one pressure spring, wherein the fastening element is loaded by the at least one pressure spring;
    wherein the housing has a receptacle, wherein the counter element is arranged In the receptacle, and wherein the at least one pressure spring is arranged in the receptacle.

2. The fastening device according to claim 1, wherein the receptacle is monolithic part of the housing.

3. The fastening device according to claim 1, wherein the counter element is a threaded sleeve.

4. The fastening device according to claim 1, wherein the counter element is configured to be tightened by the fastening element against a wall of a mounting space for the taillight.

5. The fastening device according to claim 1, wherein the housing of the taillight is secured by frictional action in a fitting position in the vehicle.

6. The fastening device according to claim 5, wherein the counter element is configured to widen by engagement of the fastening element in order to provide the friction action.

7. The fastening device according to claim 5, wherein the counter element has elastically deformable sections separated from one another by slots, wherein the elastically deformable sections are elastically deformed by engagement of the fastening element.

8. The fastening device according to claim 1, wherein the counter element has one end provided with a collar.

9. The fastening device according to claim 8, further comprising at least one pressure spring, wherein the at least one pressure spring is supported on the housing and acts on the collar.

10. The fastening device according to claim 1, wherein the housing has a receptacle and the counter element is arranged in the receptacle, wherein the receptacle has at least one stop configured to limit a movement distance of the counter element.

11. The fastening device according to claim 1, wherein the housing has a receptacle and the counter element is arranged in the receptacle, wherein the receptacle has at least one open space in a direction of movement of the counter element.

12. The fastening device according to claim 11, wherein the counter element has at least one securing element engaging the open space.

13. The fastening device according to claim 12, wherein the securing element is hook-shaped and has a nose engaging the open space.

14. The fastening device according to claim 1, wherein the fastening element is axially movable relative to the counter element.

15. The fastening device according to claim 1, wherein the fastening element and the counter element have interacting widening sections for elastically widening the counter element.

16. The fastening device according to claim 1, wherein the fastening element is a screw.

17. A fastening device for a taillight of a vehicle, comprising:
    at least one fastening element interacting with a counter element correlated with a housing of the taillight wherein the counter element is adjustable relative to the housing of the taillight;
    wherein the housing has a receptacle and the counter element is arranged in the receptacle, further comprising at least one ring surrounding the receptacle.

18. The fastening device according to claim 17, further comprising at least one pressure spring, wherein the fastening element is loaded by the at least one pressure spring.

19. The fastening device according to claim 18, wherein the housing has a receptacle, wherein the counter element is arranged in the receptacle, and wherein the at least one pressure spring is arranged in the receptacle.

20. The fastening device according to claim 18, wherein the fastening element is loaded by the pressure spring via the counter element.

21. The fastening device according to claim 17, wherein the fastening element is configured to be moved by a nut supported on the vehicle.

22. The fastening device according to claim 17, wherein the fastening element is axially movable relative to the counter element.

23. The fastening device according to claim 17, wherein the fastening element and the counter element have interacting widening sections for elastically widening the counter element.

24. A fastening device for a taillight of a vehicle, comprising:
    at least one fastening element interacting with a counter element correlated with a housing of the taillight, wherein the counter element is adjustable relative to the housing of the taillight;
    wherein the housing has a receptacle and the counter element is arranged in the receptacle, wherein the receptacle has at least one open space in a direction of movement of the counter element;
    wherein the counter element has at least one securing element engaging the open space;
    wherein the securing element is hook-shaped and has a nose engaging the open space;
    wherein the open space and the nose have identical width.

* * * * *